(12) United States Patent
Kuroda et al.

(10) Patent No.: US 9,099,206 B2
(45) Date of Patent: Aug. 4, 2015

(54) NUCLEAR REACTOR VIBRATION MONITORING DEVICE AND MONITORING METHOD THEREOF

(75) Inventors: Hidehiko Kuroda, Kanagawa (JP); Tooru Ootsubo, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 656 days.

(21) Appl. No.: 13/529,010

(22) Filed: Jun. 21, 2012

(65) Prior Publication Data
US 2012/0285246 A1 Nov. 15, 2012

Related U.S. Application Data

(63) Continuation-in-part of application No. PCT/JP2010/007420, filed on Dec. 22, 2010.

(30) Foreign Application Priority Data
Dec. 22, 2009 (JP) ................................ 2009-290391

(51) Int. Cl.
*G21C 17/003* (2006.01)
*G01H 17/00* (2006.01)
*G21C 17/10* (2006.01)

(52) U.S. Cl.
CPC .............. *G21C 17/003* (2013.01); *G01H 17/00* (2013.01); *G21C 17/10* (2013.01)

(58) Field of Classification Search
CPC ......... G21C 17/03; G21C 17/10; G01H 17/00
USPC ................... 73/597, 598, 600, 602, 609–612, 73/615–616
See application file for complete search history.

(56) References Cited

U.S. PATENT DOCUMENTS 4,472,973 A * 9/1984 Sugai et al. ..................... 73/626
5,177,711 A * 1/1993 Yamaguchi et al. .......... 367/105
(Continued)

FOREIGN PATENT DOCUMENTS

GB 1294219 A * 10/1972
JP 48-92079 11/1973
(Continued)

OTHER PUBLICATIONS

International Search Report mailed on Feb. 1, 2011 for PCT/JP2010/007420 filed on Dec. 22, 2010 with English Translation.

*Primary Examiner* — Laura Martin
*Assistant Examiner* — Rose M Miller
(74) *Attorney, Agent, or Firm* — Oblon, McClelland, Maier & Neustadt, L.L.P.

(57) ABSTRACT

According to an embodiment, a nuclear reactor monitoring device comprises: an ultrasonic wave transmission means which is installed on the outside surface of a reactor pressure vessel and transmits ultrasonic pulses to the interior of the reactor pressure vessel; an ultrasonic wave receiving means which is installed on the outside surface of the reactor pressure vessels and receives reflected pulses including ultrasonic waves from the ultrasonic pulses reflected by an inspection object in the reactor pressure vessel; a preprocessing means which specifies and removes the reflected ultrasonic pulses generated in the wall of the reactor pressure vessel from the reflected pulse signal received by the ultrasonic wave receiving means or selectively extracts the reflected pulse signal; and a calculation means which determines the vibration of the inspection object from the reflection pulse signal processed by the preprocessing means in accordance with the observation time of the inspection object.

10 Claims, 12 Drawing Sheets

(56) References Cited

U.S. PATENT DOCUMENTS

| | | | |
|---|---|---|---|
| 5,327,783 A * | 7/1994 | Au-Yang | 73/597 |
| 5,681,995 A * | 10/1997 | Ooura et al. | 73/622 |
| 2003/0089171 A1* | 5/2003 | Kenefick et al. | 73/597 |
| 2009/0282920 A1 | 11/2009 | Sato et al. | |

FOREIGN PATENT DOCUMENTS

| | | |
|---|---|---|
| JP | 11-125688 | 5/1999 |
| JP | 2003-254942 | 9/2003 |
| JP | 2009-068987 | 4/2009 |
| JP | 2009-229355 | 10/2009 |

* cited by examiner

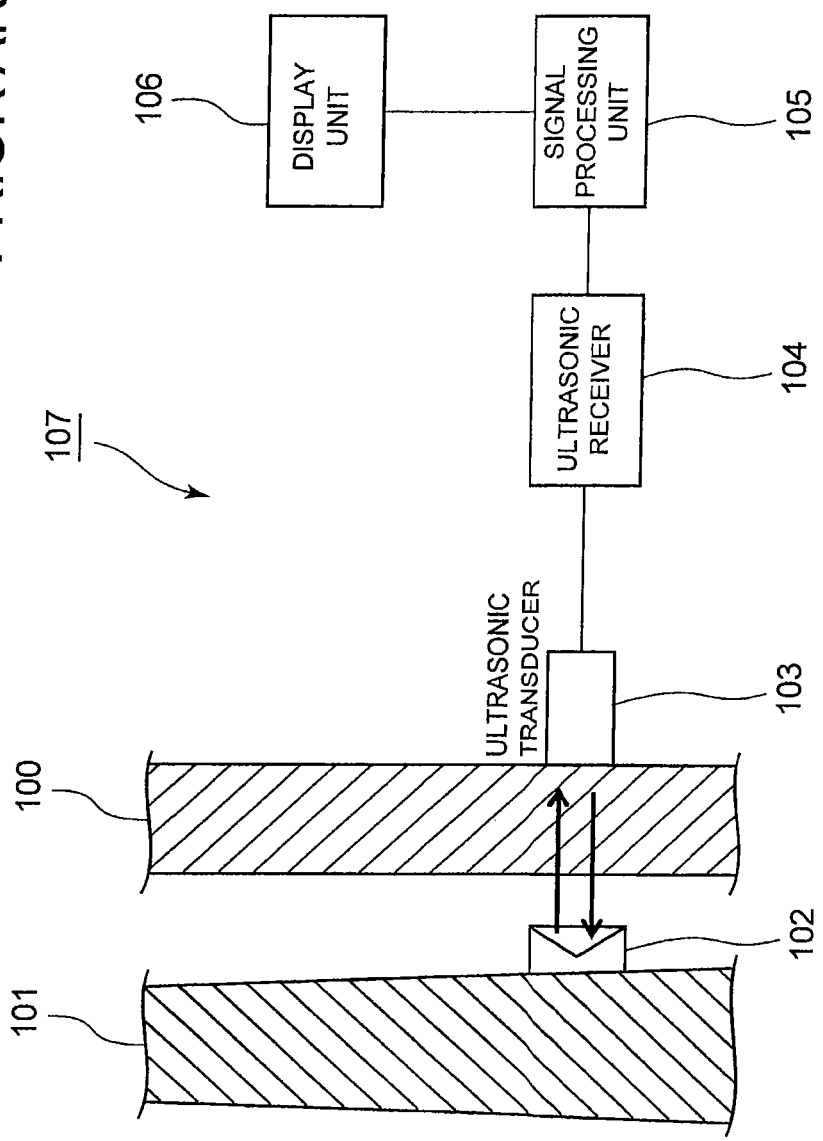

NUCLEAR REACTOR VIBRATION MONITORING DEVICE AND MONITORING METHOD THEREOF

CROSS REFERENCES TO RELATED APPLICATIONS

This application is a continuation-in-part (CIP) application based upon the International Application PCT/JP2010/007420, the International Filing Date of which is Dec. 22, 2010, the entire content of which is incorporated herein by reference, and is based upon and claims the benefits of priority from the prior Japanese Patent Application No. 2009-290391, filed in the Japanese Patent Office on Dec. 22, 2009, the entire content of which is incorporated herein by reference.

FIELD

The present embodiments relate to a nuclear reactor vibration monitoring device and monitoring method for monitoring vibrations of internal equipment from the outside of nuclear reactor pressure vessel by using ultrasonic waves.

BACKGROUND

Concerning a reactor vibration monitoring device that monitors vibrations of equipment in a nuclear reactor while the nuclear reactor is in operation, there has been known a technique of using ultrasonic waves to monitor vibrations of the internal equipment from the outside of reactor pressure vessel (for example, see Japanese Patent Application Laid-Open Publication Nos. 2009-068987 and 11-125688, the entire contents of which are incorporated here by reference).

Such a reactor vibration monitoring device will be described with reference to FIG. 16.

FIG. 16 is a block diagram showing a schematic configuration of a conventional nuclear reactor vibration monitoring device 107.

As shown in FIG. 16, the reactor vibration monitoring device 107 includes an ultrasonic transducer 103 which is installed on the outside surface of a reactor pressure vessel 100, transmits ultrasonic pulses to a reflector 102 attached to internal equipment 101 in the reactor pressure vessel 100, and receives reflected pulses.

The reflected pulses received by the ultrasonic transducer 103 are converted into a received signal through an ultrasonic receiver 104. The signal from the ultrasonic receiver 104 is received and processed by a signal processing unit 105. Vibration information processed by the signal processing unit 105 is displayed on a display unit 106.

In such a reactor vibration monitoring device 107, the reflector 102 is attached to the internal equipment 101 so that ultrasonic pulses transmitted from the ultrasonic transducer 103 are reflected by the reflector 102 and returned to the ultrasonic transducer 103. Consequently, even if the internal equipment 101 has a tilt and/or curvature, ultrasonic pulses can be transmitted and received with high sensitivity and reliability by a single ultrasonic transducer 103. Vibrations can be monitored based on changes in the time of signal received by the ultrasonic transducer 103.

In order for the reactor vibration monitoring device 107 to accurately monitor vibrations of the internal equipment 101 having a tilt and/or curvature, the reflector 102 needs to be attached to the internal equipment 101 so that ultrasonic waves are reflected with high efficiency. There has thus been a problem of attaching the reflector 102 in water by remote control.

The present invention has been achieved to solve the foregoing problem, and it is thus an object thereof to provide a reactor vibration monitoring device and monitoring method capable of accurately detecting vibrations of internal equipment having a tilt and/or curvature without attaching a reflector to the internal equipment in a reactor pressure vessel.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which:

FIG. 16 is a block diagram showing a schematic configuration of a conventional reactor vibration monitoring device.

DETAILED DESCRIPTION

In order to achieve the object written above, according to an aspect of the present invention, there is provided a reactor vibration monitoring device comprising: ultrasonic wave transmission means that is installed on an outside surface of a reactor pressure vessel and transmits ultrasonic pulses to an interior of the reactor pressure vessel; ultrasonic wave receiving means that is installed on the outside surface of the reactor pressure vessel and receives reflected pulses including ultrasonic waves of the ultrasonic pulses reflected by an inspection object in the reactor pressure vessel; preprocessing means for performing processing to exclude reflected ultrasonic pulses reflected in a wall of the reactor pressure vessel from a reflected pulse signal received by the ultrasonic wave receiving means; and calculation means for determining vibrations of the inspection object from the reflected pulse signal processed by the preprocessing means based on observation time of the inspection object.

In order to achieve the object written above, according to another aspect of the present invention, there is also provided a reactor vibration monitoring method comprising: an ultrasonic wave transmission step in which ultrasonic wave transmission means is installed on an outside surface of a reactor pressure vessel and transmits ultrasonic pulses to an interior of the reactor pressure vessel; an ultrasonic wave receiving step in which ultrasonic wave receiving means is installed on the outside surface of the reactor pressure vessel and receives reflected pulses including ultrasonic waves of the ultrasonic pulses reflected by an inspection object in the reactor pressure vessel; a preprocessing step of performing processing to exclude reflected ultrasonic pulses occurring in a wall of the reactor pressure vessel from a reflected pulse signal received by the ultrasonic wave receiving means; and a calculation step of determining vibrations of the inspection object from the reflected pulse signal processed in the preprocessing step based on observation time of the inspection object.

Hereinafter, embodiments of the reactor vibration monitoring device according to the present invention will be described with reference to the drawings. Here, identical or similar parts will be designated by the same reference symbols, and redundant description will be omitted.

Figure 1:
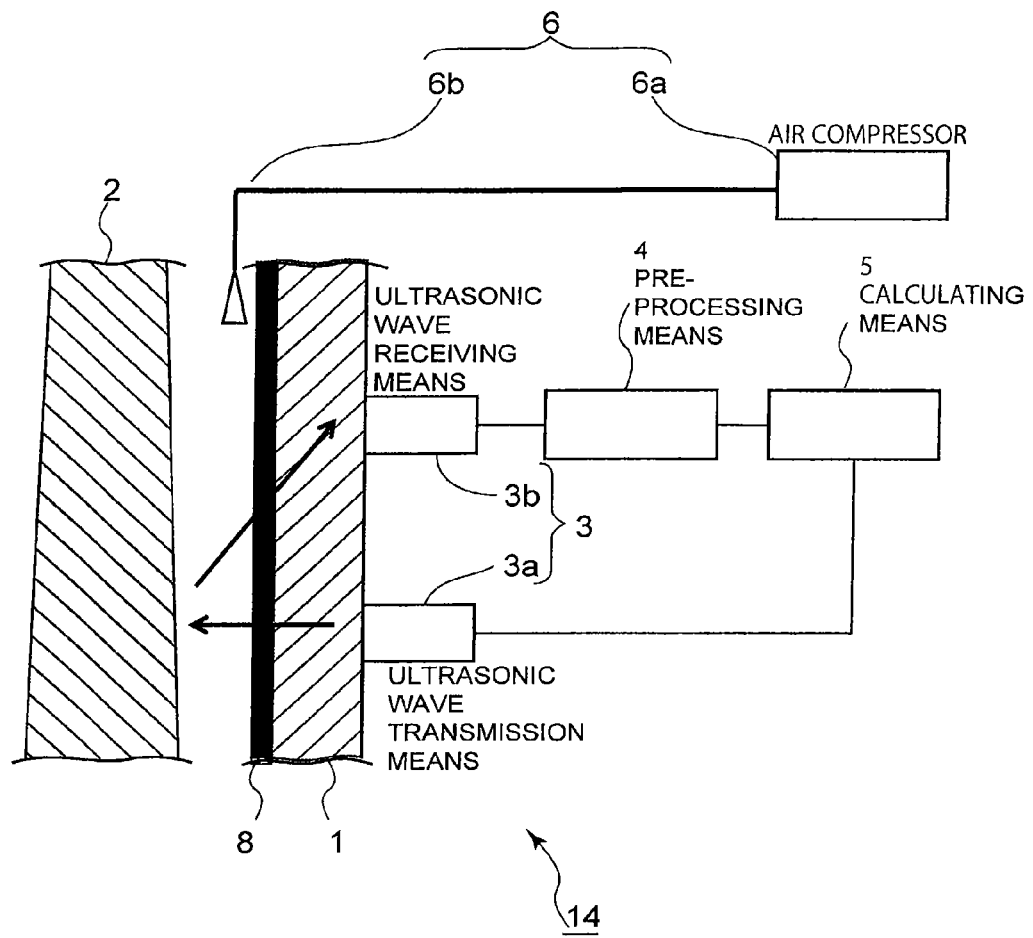
FIG. 1 is a block diagram showing a schematic configuration of a reactor vibration monitoring device according to a first embodiment of the present invention.

FIG. 1 is a block diagram showing a schematic configuration of a reactor vibration monitoring device 14 according to a first embodiment of the present invention.

Initially, the basic configuration of the reactor vibration monitoring device 14 will be described with reference to FIG. 1.

As shown in the diagram, the reactor vibration monitoring device 14 includes an ultrasonic wave transmission and receiving means 3 including: an ultrasonic wave transmission means 3a which is installed on an outside surface of a reactor pressure vessel 1 and transmits ultrasonic pulses to the interior of the reactor pressure vessel 1; and an ultrasonic wave receiving means 3b for receiving reflected pulses reflected by an inspection object 2 in the reactor pressure vessel 1. That is, the ultrasonic wave transmission means 3a transmits ultrasonic pulses to the interior of the reactor pressure vessel 1, and ultrasonic pulses reflected by the inspection object 2 are received by the ultrasonic wave receiving means 3b.

The ultrasonic wave receiving means 3b receives reflected ultrasonic pulses and transmits a received signal to a preprocessing means 4. The preprocessing means 4 performs an analog-to-digital conversion on the received signal of the ultrasonic wave receiving means 3b, and performs differential processing between the waveform of the received signal including a reflection ultrasonic pulse signal and a waveform stored in advance. The received signal that is differential-processed by the preprocessing means 4 is transmitted to a calculation means 5. The calculation means 5 determines vibrations of the inspection object 2 based on changes in the observation time of the reflected ultrasonic pulses from the inspection object 2.

An interrupting means 6 for interrupting ultrasonic pulses transmitted to the usually-immersed inspection object 2 for an arbitrary time is arranged between an inside surface of the reactor pressure vessel 1 and the inspection object 2. For example, the interrupting means 6 is composed of an air compressor 6a which supplies compressed air and a bubble jetting means 6b which jets out the compressed air.

The reactor vibration monitoring device 14 is applicable to various types of nuclear reactors such as a boiling water reactor and a pressurized water reactor. When in operation, the outside surface of the reactor pressure vessel 1 is in a high temperature and high radiation environment. For example, the temperature of the outside surface reaches approximately 300 degrees Centigrade in the case of a boiling water reactor, and approximately 325 degrees Centigrade in the case of a pressurized water reactor. A clad weld layer 8 which interferes with propagation of ultrasonic waves lies on the inside surface of the reactor pressure vessel 1.

The inspection object 2 is internal equipment that is installed in water in the nuclear reactor. In the case of a boiling water reactor, the inspection object may include the shroud and the jet pumps. Such internal equipment has a complicated shape. A portion to be irradiated with the ultrasonic waves for vibration measurement is often shaped to have a curvature and/or tilt. While in the example of FIG. 1, the inspection object 2 is shown in a sectional elevational view, the inspection object 2 is shaped to have tilted vertical surfaces and a curved horizontal cross-section.

The ultrasonic wave transmission means 3a is an ultrasonic transducer using a piezoelectric effect, and may be made of a piezoelectric element of lead zirconate titanate (PZT), lithium niobate (LN), lithium tantalite (LT), or the like. The frequency of ultrasonic waves to be transmitted and received by the ultrasonic wave transmission and receiving means 3 is set to, for example, between several hundreds of kilohertz and several tens of megahertz so that the ultrasonic waves propagate through steel material and water. The ultrasonic wave transmission and receiving means 3 is fixed to the outside surface of the reactor pressure vessel 1 using contact medium of soft metal such as Au, Ag, Cu, Al, and Ni.

The ultrasonic wave receiving means 3b may be made of an electrodynamic transducer using a magnetostrictive effect.

While the ultrasonic wave transmission and receiving means 3 composed of the ultrasonic wave transmission means 3a and the ultrasonic wave receiving means 3b has been described, an ultrasonic wave transmission and receiving means that serves both as a transmission means and a receiving means may be used.

The preprocessing means 4 includes: a not-shown analog-to-digital converter to electrically amplify an input signal and then to convert the same into digital data; a storage circuit that stores the digital data; and a calculation circuit that performs a differential calculation between the input signal converted into the digital data and the stored digital data and makes an output.

The analog-to-digital converter operates at time intervals of $\Delta t$ (sec), and converts an input signal of predetermined time width, including reflected ultrasonic pulses, into digital data with a sampling frequency of f (Hz). Based on the sampling theorem, f (Hz) is set at or above twice the frequency of ultrasonic waves to be transmitted and received. Similarly, the digital data stored in the storage circuit is data of a sampling frequency that is set at or above twice the frequency of ultrasonic waves to be transmitted and received.

Next, the calculation means 5 is a signal processing circuit that determines vibrations and amplitude of the inspection object 2 from reflected ultrasonic pulses reflected by the inspection object 2. When the inspection object 2 vibrates, the propagation time of the reflected ultrasonic pulses from the inspection object 2 changes. Here, an input signal of predetermined time width including reflected ultrasonic pulses is obtained at time intervals of $\Delta t$ (sec). The propagation times of the reflected ultrasonic pulses extracted from input signals obtained in succession can be arranged in a time series to acquire data on changes in the propagation time of the reflected ultrasonic pulses.

Then, the acquired data can be analyzed in frequency to determine the vibration frequency of the inspection object 2.

The magnitude of the vibration amplitude can be determined by determining a time change width of the propagation time in the acquired data, multiplying the time change width by the velocity of sound, and dividing the resultant by 2. The time change width of the propagation time may be more accurately determined from interpolated data of the acquired data or from the function approximation of the acquired data.

Since the propagation time is turnaround time to and from the inspection object 2, the vibration amplitude of the inspection object 2 needs to be determined by a division by 2. Based on the sampling theorem, $1/\Delta t$ (Hz) must be set to be higher than or equal to twice the vibration frequency of the inspection object 2.

The interrupting means 6 is a means for interrupting or scattering ultrasonic waves that propagate through the reactor water between the reactor pressure vessel 1 and the inspection object 2, so that reflected ultrasonic pulses from the inspection object 2 do no reach the ultrasonic wave receiving means 3b. In the above-described configuration example, the air compressor 6a sends compressed air to the bubble jetting means 6b. The bubble jetting means 6b or a nozzle jets out bubbles into the propagation path of ultrasonic waves with an adjusted flow rate and bubble size, thereby interrupting the ultrasonic waves. Here, the bubble size is set to be sufficiently greater than the wavelength of ultrasonic waves to be transmitted and received.

For another example of the interrupting means 6, a steel plate or the like that reflects or scatters ultrasonic waves may be inserted into the propagation path as an interrupting means. In such a case, care needs to be taken to prevent the inserted steel plate or the like from dropping. Alternatively, the water level may be lowered to put the propagation path into the air for interruption of ultrasonic waves.

In the present embodiment of such a configuration, ultrasonic pulses transmitted from the ultrasonic wave transmission means 3a are passed through the wall of the reactor pressure vessel 1 and the clad weld layer 8 and made to enter the reactor water perpendicularly. Here, the ultrasonic pulses are reflected and attenuated by the boundary between the wall of the reactor pressure vessel 1 and the clad weld layer 8 and the boundary between the clad weld layer 8 and the reactor water. The ultrasonic pulses are further attenuated in the clad weld layer 8.

Figure 3:
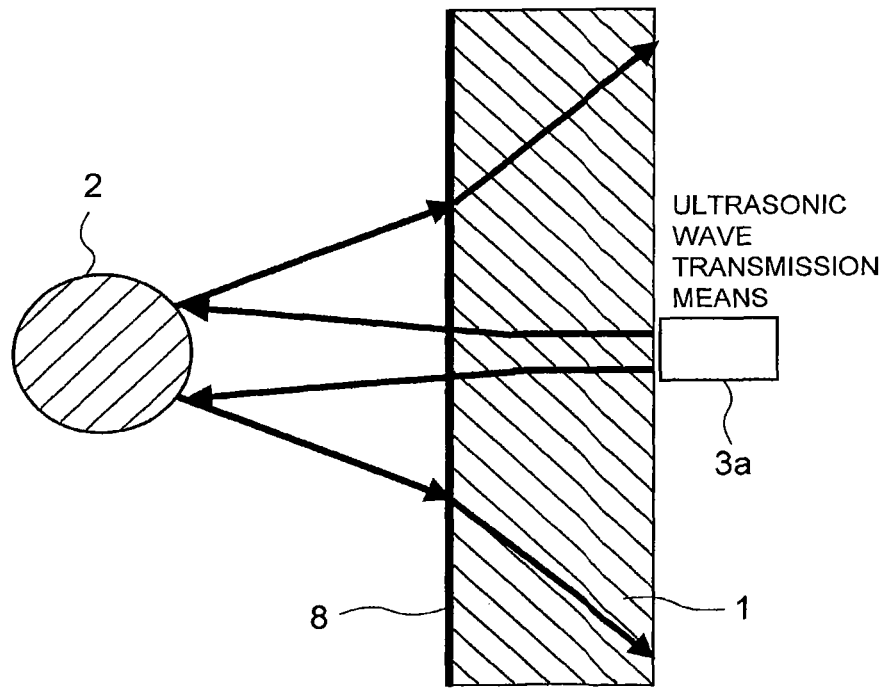
FIG. 3 is a cross-sectional view showing reflection of reflected ultrasonic pulses at a curved surface.
Figure 4:
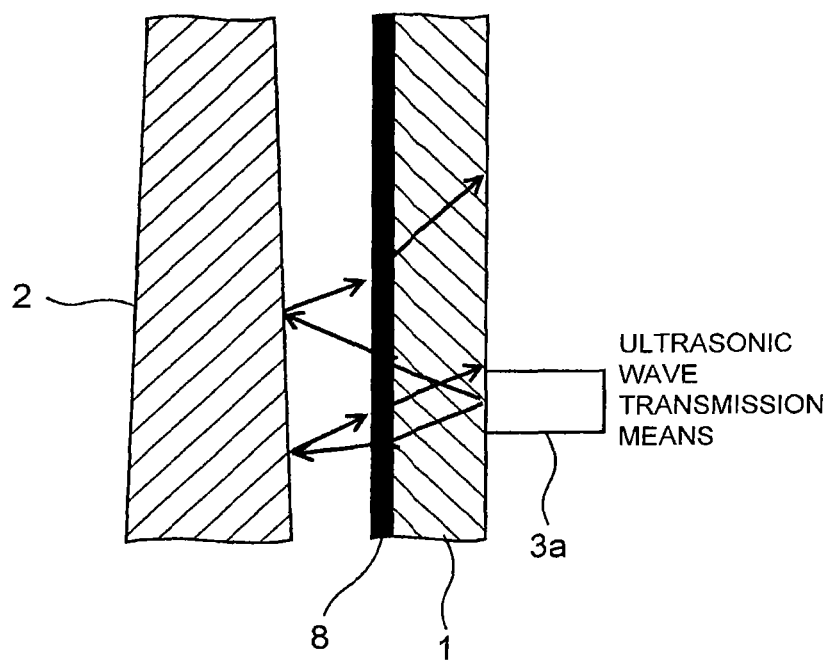
FIG. 4 is a longitudinal sectional view showing reflection of reflected ultrasonic pulses at a tilt surface.

Entering the reactor water, the ultrasonic pulses then travel straight and are reflected by the inspection object 2. Since the inspection object 2 has a tilt and/or a curvature, the reflected ultrasonic pulses propagate with additional spreading and angles. For example, if the inspection object 2 has a curvature as shown in FIG. 3, the reflected ultrasonic pulses horizontally spread out due to the effect of the curvature of the inspection object 2. If the inspection object 2 is tilted as shown in FIG. 4, the reflected ultrasonic pulses vertically propagate with additional angle due to the effect of the tilt of the inspection object 2.

Figure 5:
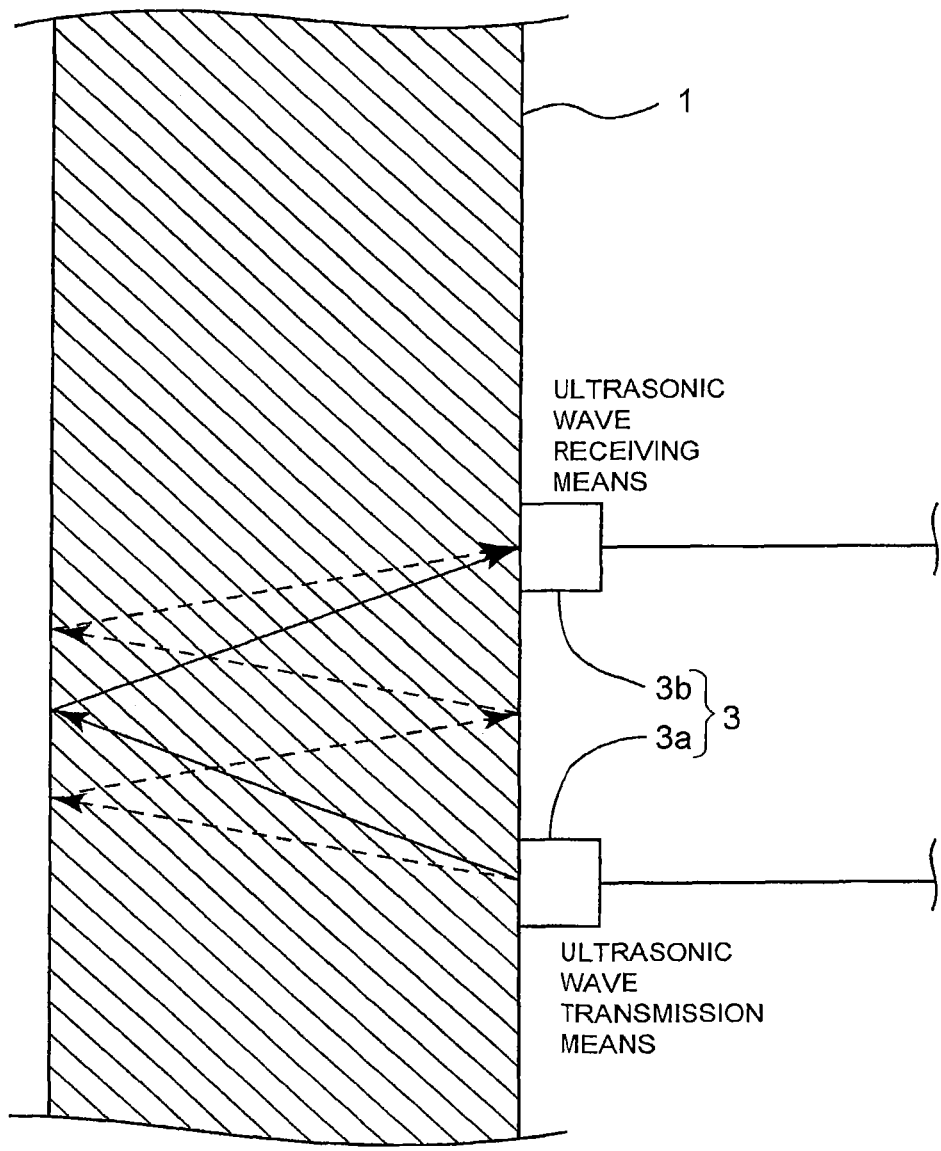
FIG. 5 is a longitudinal sectional view showing reflection of reflected ultrasonic pulses in a wall.

Moreover, as shown in FIG. 5, some of the ultrasonic pulses repeat reflections in the wall of the reactor pressure vessel 1 before reaching the ultrasonic wave receiving means 3b.

Like the transmitted ultrasonic pulses, the reflected ultrasonic pulses are also reflected and attenuated by the boundary between the wall of the reactor pressure vessel 1 and the clad weld layer 8 and the boundary between the clad weld layer 8 and the reactor water. The reflected ultrasonic pulses are further attenuated in the clad weld layer 8.

As seen above, the reflected ultrasonic pulses from the inspection object 2 are reflected and attenuated by the boundary between the wall of the reactor pressure vessel 1 and the clad weld layer 8 and the boundary between the clad weld layer 8 and the reactor water, and further attenuated in the clad weld layer 8. In addition, the reflected ultrasonic pulses are significantly attenuated due to the spreading caused by the tilt and curvature of the inspection object 2. Ultrasonic pulses observed also include ones that are reflected in the wall of the reactor pressure vessel 1 before reaching the ultrasonic wave receiving means 3b. Consequently, the received signal of the ultrasonic wave receiving means 3b includes reflected ultrasonic pulses from the inspection object 2, which makes it difficult to distinguish from noise such as ultrasonic pulses reflected in the wall of the reactor pressure vessel 1.

Here, the processing to be performed by the preprocessor 4 will be described with reference to FIG. 6.

Figure 6:
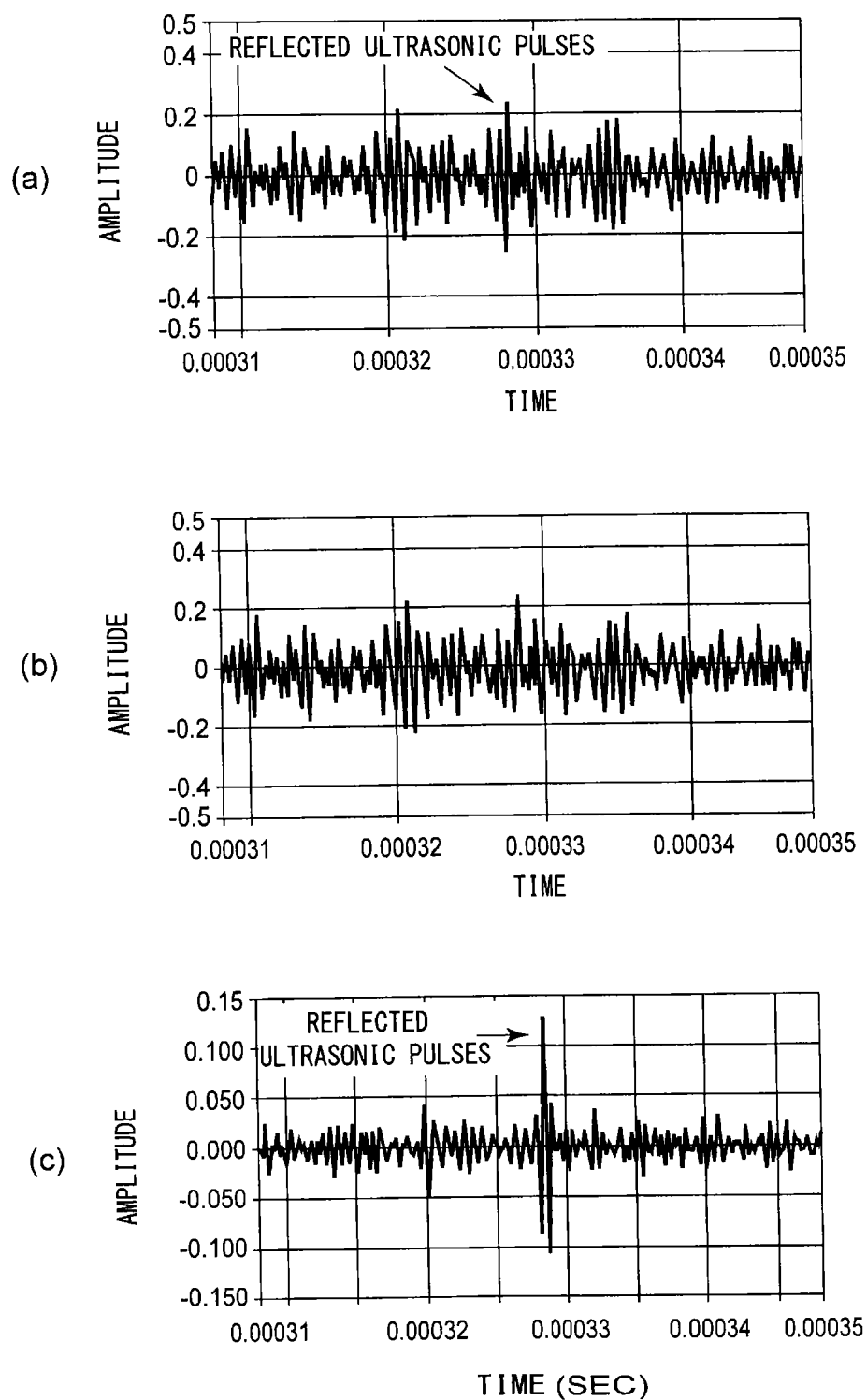
FIG. 6 is an explanatory diagram showing output of a preprocessing means, FIG. 6(*a*) being a graph before processing, FIG. 6(*b*) a stored graph for a case with interruption or scattering, and FIG. 6(*c*) a graph of the result of differential processing.

FIG. 6 is an explanatory diagram showing examples of output of the preprocessing means 4. FIG. 6(a) is a graph of an unprocessed waveform that is input from the ultrasonic wave receiving means 3b to the preprocessing means 4. FIG. 6(b) is a graph of a waveform stored in advance in the preprocessing means 4. FIG. 6(c) is a graph of the result of differential processing of FIGS. 6(a) and 6(b). The amplitudes are in an arbitrary unit.

The preprocessing means 4 performs a differential calculation between the waveform of reflected ultrasonic pulses converted into digital data, shown in FIG. 6(a), and the waveform intended for differential processing shown in FIG. 6(b). The waveform shown in FIG. 6(b) is one in a state where no reflected ultrasonic pulse from the inspection object 2 is received by the ultrasonic wave receiving means 3b. In other words, the waveform shown in FIG. 6(b) results from reflected ultrasonic waves and the like in the wall of the reactor pressure vessel 1, and thus corresponds to the noise in the waveform of FIG. 6(a) other than reflected ultrasonic pulses.

As for the waveform of FIG. 6(b), for example, data for a case where ultrasonic pulses and reflected ultrasonic pulses propagating through the reactor water between the reactor pressure vessel 1 and the inspection object 2 are interrupted or scattered or equivalent digital data is prepared in advance (for example, data acquired in past operations or determined by simulation), and stored in the preprocessing means 4.

The differential processing of FIGS. 6(a) and 6(b) thus removes noise from FIG. 6(a) to produce a waveform as shown in FIG. 6(c). The resulting waveform has a high S/N ratio (signal-noise ratio) with respect to reflected ultrasonic pulses from the inspection object 2.

When it is difficult to prepare a waveform to be used for differential processing in advance or when acquiring a more accurate waveform from actual equipment, the interrupting means 6 can be used to acquire a waveform corresponding to FIG. 6(b). The method will be described below.

First, a method of acquiring the waveform of FIG. 6(b) by using the foregoing interrupting means 6 including the air compressor 6a and the bubble jetting means 6b will be described below. The air compressor 6a of the interrupting means 6 shown in FIG. 1 is operated for an arbitrary time, so that the bubble jetting means 6b sends bubbles into the propagation path and fills the propagation path with bubbles. As a result, ultrasonic pulses and reflected ultrasonic waves are scattered by the bubbles in the propagation path and are substantially interrupted. In such a state, ultrasonic waves or ultrasonic pulses transmitted from the ultrasonic wave transmission means 3a will not be reflected by the inspection object 2 to reach the ultrasonic wave receiving means 3b. The output of the ultrasonic wave receiving means 3b thus has a waveform like FIG. 6(b). Pieces of digital data shown in FIG. 6(b) can thus be acquired as many as needed.

If the interrupting means is configured as a steel plate or the like inserted between the ultrasonic wave transmission and receiving means 3 and the inspection object 2 as mentioned above, the inserted steel plate or the like reflects and attenuates ultrasonic waves. Even in such a case, ultrasonic waves can be interrupted and data can be acquired as in the case of using the air compressor 6a and the bubble jetting means 6b.

Figure 2:
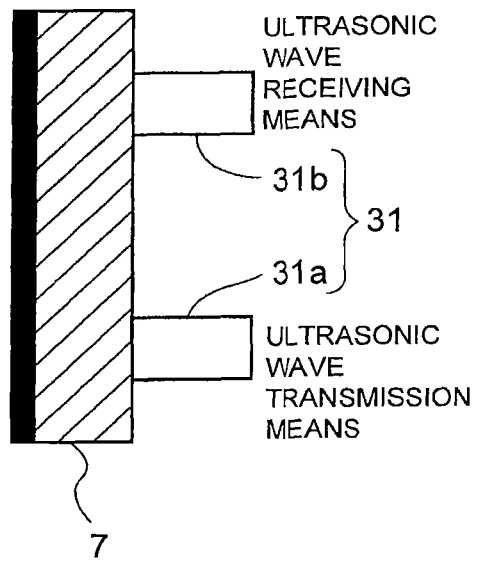
FIG. 2 is a longitudinal sectional view showing a schematic structure of a partial replica.

When an interrupting means 6 such as described above is difficult to apply, a partial replica 7 shown in FIG. 2 may be used instead. The partial replica 7 is provided with an ultrasonic wave transmission and receiving means 31 which is composed of an ultrasonic wave transmission means 31a and an ultrasonic wave receiving means 31b for replica. A sample of the actual wall may be used as the partial replica 7.

As shown in FIG. 2, the ultrasonic wave transmission and receiving means 31 is arranged on the partial replica 7 that is installed near the ultrasonic wave transmission and receiving means 3 attached to the reactor pressure vessel 1, in the same relative positional relationship as that of the ultrasonic wave transmission and the receiving means 3 of FIG. 1.

More specifically, the partial replica 7 is a partial replica that simulates a part of the wall of the reactor pressure vessel 1. The partial replica 7 has the same material and thickness as those of the wall of the reactor pressure vessel 1 shown in FIG. 1, and has the clad weld layer 8. The partial replica 7 has dimensions or size such that the ultrasonic wave transmission means 31a and the ultrasonic wave receiving means 31b of the ultrasonic wave transmission and receiving means 31 can be installed. The partial replica 7 is desirably installed near the ultrasonic wave transmission and receiving means 3 so as to be in the same temperature environment as that of the wall of the reactor pressure vessel 1 where the ultrasonic wave transmission means 3a and the ultrasonic wave receiving means 3b are installed. It will be understood that the installation position need not necessarily be near the ultrasonic wave transmission and receiving means 3, because similar temperature environment may be created by using a heater or the like.

Consequently, the received signal acquired by using the ultrasonic wave transmission and receiving means 31 installed on the partial replica 7 results mainly from reflected ultrasonic waves in the wall of the partial replica 7, and a waveform equivalent to FIG. 6(b) can be obtained.

Figure 7:
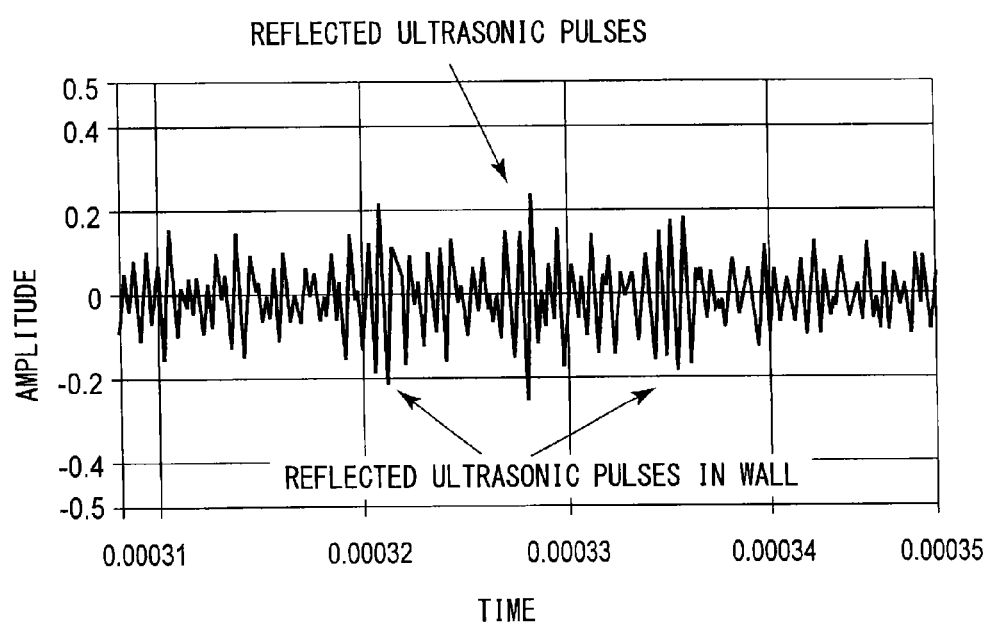
FIG. 7 is a graph showing the output of the preprocessing means when the partial replica is used.

In the present embodiment of such a configuration, reflected ultrasonic pulses in the wall of the partial replica 7 shown in FIG. 7 are stored into the preprocessing means 4 as digital data, whereby propagation time thereof can be determined. As a result, noise occurring from ultrasonic waves reflected in the wall of the reactor pressure vessel 1 can be excluded by waveform differential processing. This facilitates identifying reflected ultrasonic pulses from the inspection object 2.

Another method for avoiding noise occurring from ultrasonic waves reflected in the wall of the reactor pressure vessel 1 will be described below. FIG. 5 shows in full lines the path of ultrasonic waves that are reflected once in the wall of the reactor pressure vessel 1 and reach the ultrasonic wave receiving means 3b, and in broken lines the path of ultrasonic waves that are reflected three times and reach the ultrasonic wave receiving means 3b (the clad weld layer 8 is omitted from the diagram). The lengths of such ultrasonic wave paths can be determined from the thickness of the wall of the reactor pressure vessel 1, the installation positions of the ultrasonic wave transmission means 3a and the ultrasonic wave receiving means 3b, and the numbers of reflections of ultrasonic waves. If temperature is known, the velocity of sound is known and the observation time at the ultrasonic wave receiving means 3b can be determined. Even when temperature is unknown, the observation time of ultrasonic waves reflected three times or more in the wall can be determined based on a first peak in the received waveform of the ultrasonic wave receiving means 3b if the first peak can be identified, because the first peak represents ultrasonic waves that are reflected once in the wall of the reactor pressure vessel 1 and reach the ultrasonic wave receiving means 3b.

Using such a method, the observation time of reflected ultrasonic pulses in the wall can be determined to exclude the reflected ultrasonic pulses in the wall of the reactor pressure vessel 1. Peaks of the reflected ultrasonic waves in the wall can thus be prevented from being misjudged to be reflected ultrasonic pulses from the inspection object 2. In addition, the exclusion of reflected ultrasonic pulses in the wall of the reactor pressure vessel 1 is performed by processes such as reducing signals of the corresponding observation time or excluding reflected ultrasonic pulses from the corresponding observation time when identifying reflected ultrasonic pulses from the inspection object 2.

The processing of excluding reflected ultrasonic pulses in the wall of the reactor pressure vessel 1 can be used with the foregoing waveform differential processing.

As a result, the calculation means 5 can easily extract reflected ultrasonic pulses from the inspection object 2 as shown in FIG. 6(c).

In addition, various types of techniques may be applied to the extraction of reflected ultrasonic pulses, including retrieval of maximum and minimum values, a threshold determination on amplitude intensity, and retrieval of maximum values in correlative calculation with transmitted ultrasonic pulses. Then, the vibration frequency and vibration amplitude of the inspection object 2 can be determined from the data on changes in the propagation time of the reflected ultrasonic pulses extracted.

Furthermore, the identification of reflected ultrasonic pulses from the inspection object 2 may be performed based on a waveform barycenter, for example.

According to the present embodiment, even when detecting vibrations of internal equipment having a tilt and/or curvature in the reactor pressure vessel 1, reflected ultrasonic pulses from the internal equipment can be obtained at a high S/N ratio by differential processing of measurement data including the reflected ultrasonic pulses from the internal equipment and storage data stored in advance including no reflected ultrasonic pulse from the internal equipment. This allows accurate vibration detection.

The ultrasonic-wave interrupting means can be used to interrupt ultrasonic pulses and reflected ultrasonic waves for an arbitrary time, whereby data intended for differential processing, including no reflected ultrasonic pulse from the internal equipment, can be quickly acquired. Then, differential processing with measurement data including reflected ultrasonic pulses from the internal equipment can determine reflected ultrasonic pulses from the internal equipment at a high S/N ratio, which allows accurate vibration detection.

If reflected ultrasonic pulses in a wall are measured by using the partial replica 7 that is installed near the ultrasonic wave transmission and receiving means 3 attached to the reactor pressure vessel 1, it is possible to acquire measurement data on propagation time almost same as or quite similar to that of reflected ultrasonic pulses in the wall of the reactor pressure vessel 1. Then, the foregoing differential processing can be performed to increase the S/N ratio of reflected ultrasonic pulses from the inspection object 2 for accurate vibration detection.

In addition, reflected ultrasonic pulses in a wall are identified by calculation using the positional relationship of the ultrasonic wave transmission and receiving means 3 and the wall thickness and temperature of the reactor pressure vessel 1. Since a peak that is observed in minimum time results from ultrasonic waves reflected once by the inside surface of the reactor pressure vessel 1, the velocity of sound can be determined based on the observation time of the peak. Using the velocity of sound, the observation times of ultrasonic pulses reflected a plurality of times in the wall can also be experimentally identified. Then, reflected ultrasonic pulses in the wall can be excluded from the measurement data including reflected ultrasonic pulses from the internal equipment, even if noises having higher amplitudes can be circumvented for accurate vibration detection.

Figure 8:
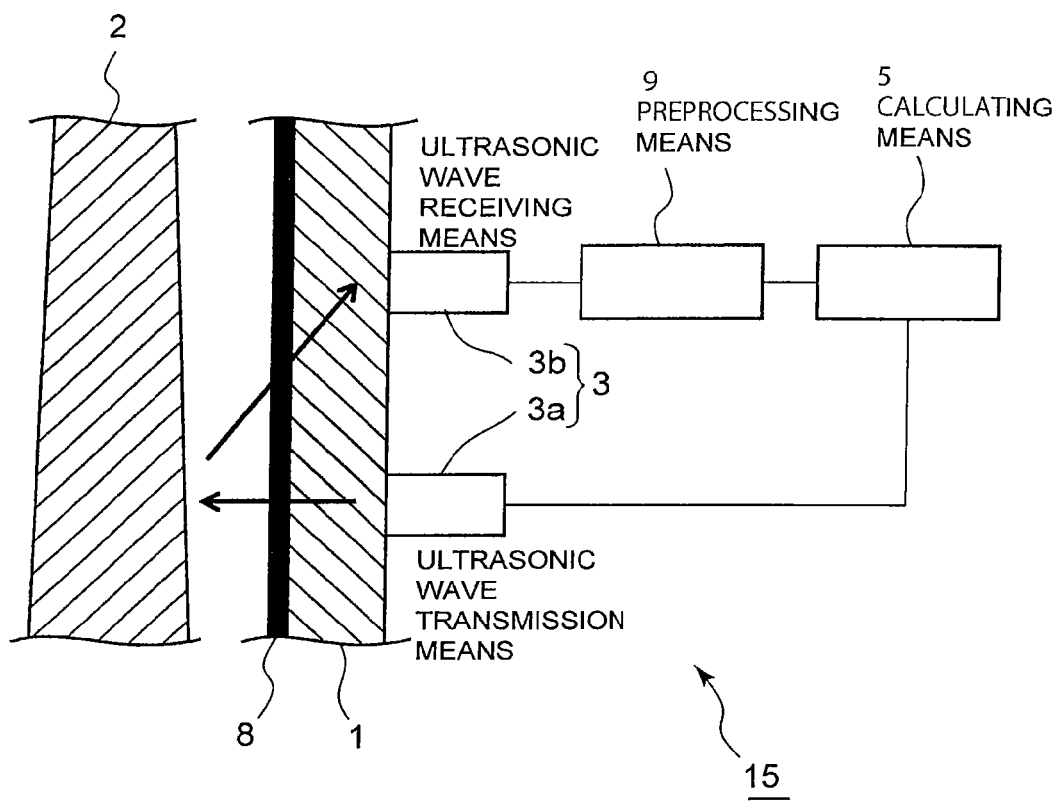
FIG. 8 is a block diagram showing a schematic configuration of a reactor vibration monitoring device according to a second embodiment of the present invention.

FIG. 8 is a block diagram showing a schematic configuration of a reactor vibration monitoring device according to a second embodiment of the present invention. Parts identical or similar to those of FIG. 1 will be designated by the same reference symbols, and redundant description will be omitted.

As shown in the diagram, the reactor vibration monitoring device 15 includes: an ultrasonic wave transmission and receiving means 3 which is installed on the outside surface of a reactor pressure vessel 1, transmits ultrasonic pulses to the interior of the reactor pressure vessel 1, and receives reflected pulses reflected by an inspection object 2; a preprocessing means 9 which processes a reflected pulse signal received by an ultrasonic wave receiving means 3b based on the wall thickness of the reactor pressure vessel 1 and the attached positions of an ultrasonic wave transmission means 3a and the ultrasonic wave receiving means 3b which constitute the ultrasonic wave transmission and receiving means 3; and a calculation means 5 which determines vibrations of the inspection object 2 from the reflected pulse signal processed by the preprocessing means 9 based on observation time of the inspection object 2.

Like the preprocessing means 4 of FIG. 1, the preprocessing means 9 includes a not-shown analog-to-digital converter that performs conversion into digital data, as well as a mask circuit that extracts digital data from the converted digital data according to designated start position and end position, a calculation circuit that performs four arithmetic operations on the digital data, and a filtering circuit that performs frequency filtering on the digital data.

The analog-to-digital converter has a sampling frequency off (Hz). Based on the sampling theorem, the maximum possible value of the filtering frequency of the filtering circuit is limited to f/2 (Hz).

Figure 9:
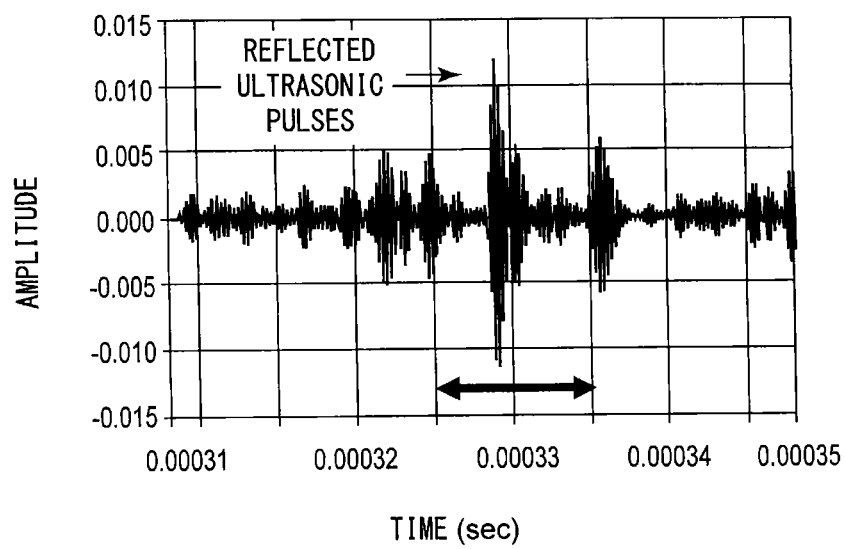
FIG. 9 is a graph showing a first example of the output of the preprocessing means of FIG. 8.

The preprocessing means 9 according to the present embodiment converts reflected frequency pulses into digital data, squares the value of the digital data, and then performs frequency filtering processing of passing a low frequency range including the frequency of transmitted ultrasonic waves. Such processing produces noise-reduced high-S/N (signal-to-noise ratio) reflected ultrasonic pulses as shown in FIG. 9.

If the dimensions and arrangement of the inspection object 2 are known from a drawing or by actual measurement, the propagation time of reflected ultrasonic pulses in a wall can be calculated from the positional relationship of the inspection object 2 based on the positional relationship of the ultrasonic wave transmission means 3a and the ultrasonic wave receiving means 3b and the temperature of the reactor pressure vessel 1.

As a different process, the preprocessing means 9 may determine the velocity of sound from the output waveform of the ultrasonic wave receiving means 3b without known temperature since reflected ultrasonic pulse observed in minimum time is the ultrasonic wave reflected once by the inside surface of the reactor pressure vessel 1. Consequently, the observation time of reflected ultrasonic pulses from the inspection object 2 can be determined by using the velocity of sound and the distance between the ultrasonic wave transmission and receiving means 3 and the inspection object 2.

Figure 10:
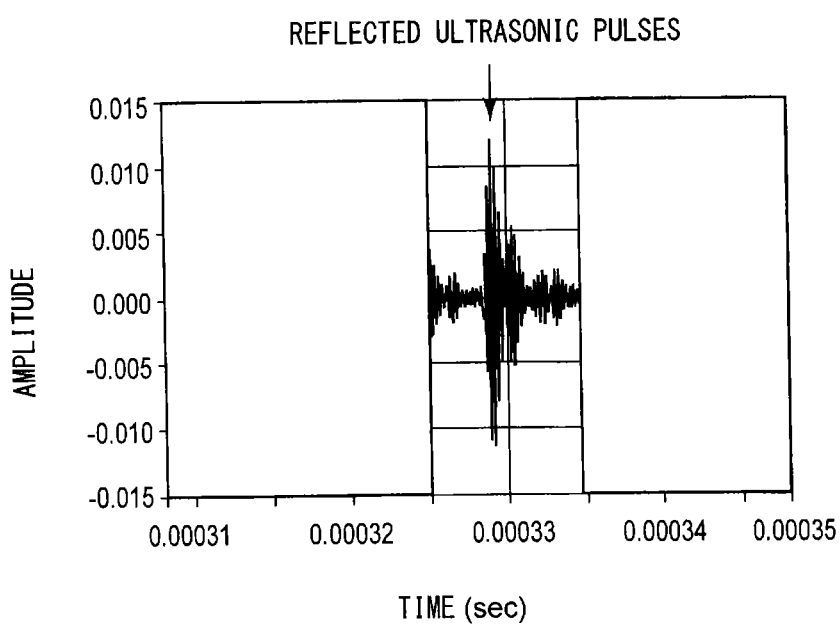
FIG. 10 is a graph showing a second example of the output of the preprocessing means of FIG. 8.

As a result, the preprocessing means 9 can determine the propagation time of the reflected ultrasonic pulses from the inspection object 2, and extracts a certain time domain caused by variation of temperature and distance. FIG. 10 shows the processing result. Noise-based peaks can be prevented from being misjudged to be reflected ultrasonic pulses from the inspection object 2, and the reflected ultrasonic pulses from the inspection object 2 can be detected with higher reliability.

As described above, the calculation means 5 can easily extract reflected ultrasonic pulses as shown in FIGS. 9 and 10, and can determine the vibration frequency and vibration amplitude of the inspection object 2 from the data on changes in the propagation time of the reflected ultrasonic pulses extracted.

According to the present embodiment, the propagation time of reflected ultrasonic pulses is determined from the dimensions and arrangements of the inspection object, and a certain time domain caused by variation of temperature and distance is extracted. This makes it possible to detect reflected ultrasonic pulses from the internal equipment without fail, allowing accurate vibration detection.

Even when detecting vibrations of the internal equipment 2 having a tilt and/or a curvature in the reactor pressure vessel 1 in the presence of errors in dimensions and arrangements, heat deterioration and/or measurement errors in temperature, the observation time of reflected ultrasonic pulses from the inspection object 2 is extracted from the received waveform including a reflected pulse signal. This can remove reflected ultrasonic pulses occurring in the wall of the reactor pressure vessel 1 to increase the S/N ratio of reflected ultrasonic pulses from the internal equipment 2, and vibrations of the inspection object 2 can be accurately detected.

Moreover, even when detecting vibrations of the internal equipment having a tilt and/or a curvature in the reactor pressure vessel 1, reflected ultrasonic pulses from the internal equipment 2 can be obtained with a high S/N ratio by squaring the amplitude of measurement data including the reflected ultrasonic pulses from the internal equipment and then performing frequency filtering processing of passing a low frequency range including the frequency of the transmitted ultrasonic waves. This allows accurate vibration detection.

Figure 11:
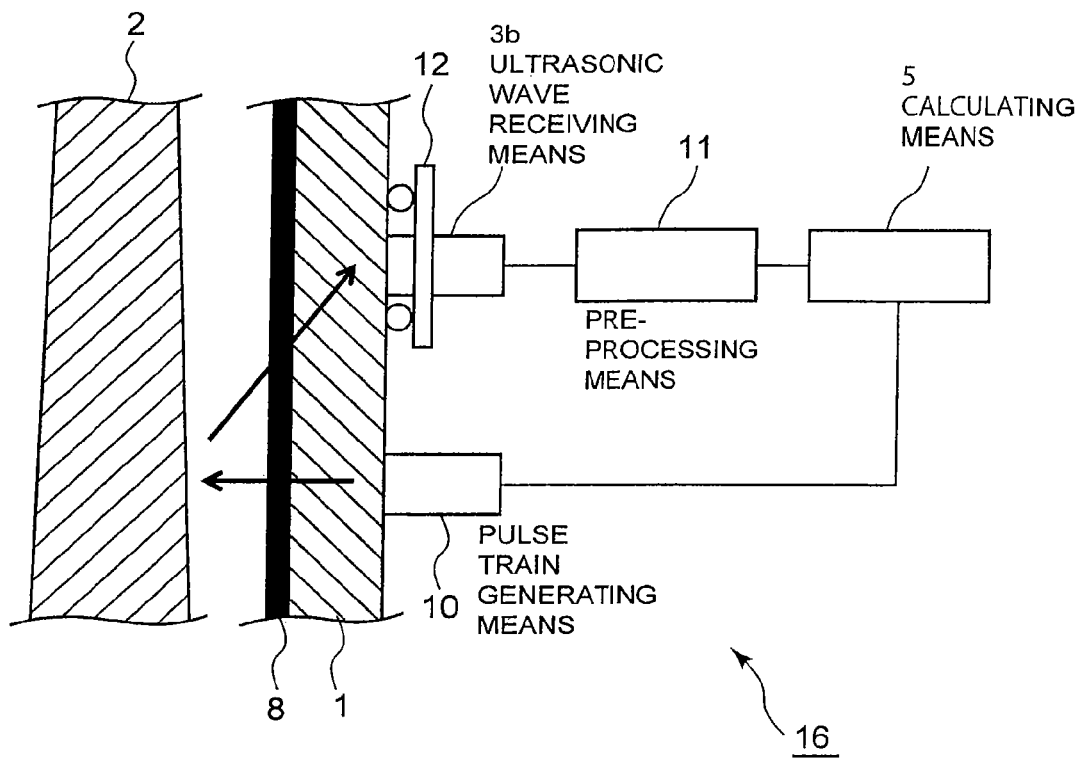
FIG. 11 is a block diagram showing a schematic configuration of a reactor vibration monitoring device according to a third embodiment of the present invention.

FIG. 11 is a block diagram showing a schematic configuration of a reactor vibration monitoring device 16 according to a third embodiment of the present invention.

Parts identical or similar to those of FIG. 1 will be designated by the same reference symbols, and redundant description will be omitted.

As shown in the diagram, the reactor vibration monitoring device 16 includes: a pulse train generating means 10 which is installed on the outside surface of a reactor pressure vessel 1 and transmits an ultrasonic pulse train to an inspection object 2 in the reactor pressure vessel 1; and an ultrasonic wave receiving means 3b which receives reflected ultrasonic pulses reflected by the inspection object 2. The reactor vibration monitoring device 16 also includes: a preprocessing means 11 which calculates a correlation between a received waveform including a reflected pulse signal of a pulse train received by the ultrasonic wave receiving means 3b and the waveform of the transmitted ultrasonic pulse train; a calculation means 5 which extracts a reflected pulse signal and determines vibrations of the inspection object 2 from temporal changes in observation time; and a position adjusting means 12 which adjusts positional relationship of the ultrasonic wave receiving means 3b.

Figure 12:
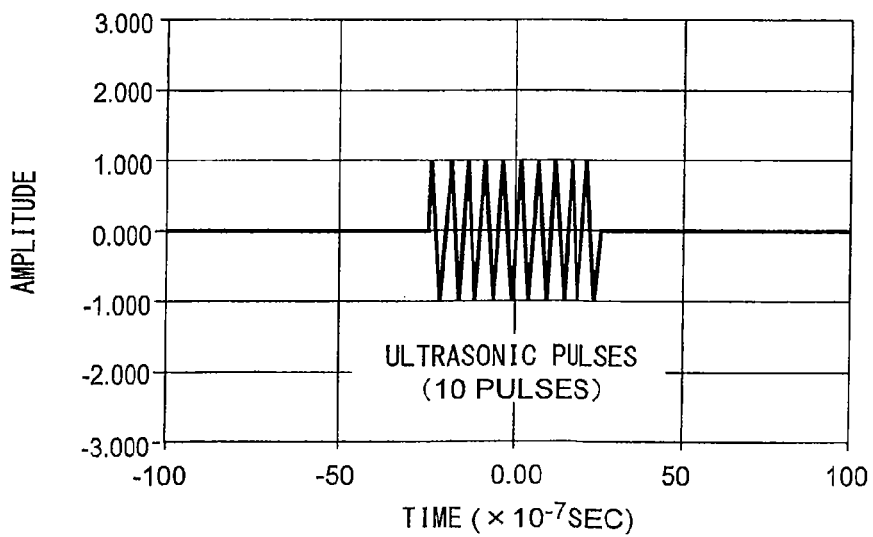
FIG. 12 is a graph showing ultrasonic pulse train form generated by a pulse train generating means of FIG. 11.

Like the ultrasonic wave transmission means 3a shown in FIG. 1, the pulse train generating means 10 mentioned above is an ultrasonic wave transmission element using a piezoelectric transducer or electromagnetic acoustic transducer. The pulse train generating means 10 receives input of an arbitrary number of consecutive electrical pulses and generates ultrasonic waves of pulse train form shown in FIG. 12. In the example of FIG. 12, the pulse train includes ten pulses, whereas the number of pulses of ultrasonic waves and the frequency of the ultrasonic waves may be arbitrarily set.

Aside from a not-shown analog-to-digital converter and a not-shown storage circuit as in FIG. 1, the preprocessing means 11 includes a calculation circuit that performs a correlation calculation between converted digital data of an input signal and stored digital data and makes an output.

The position adjusting means 12 is a moving mechanism for changing the position of the ultrasonic wave receiving means 3b. The position adjusting means 12 moves over the outside surface of the reactor pressure vessel 1 by such means as wheels and a reaction force of a blower, and fixes the ultrasonic wave receiving means 3b by a magnetic force, suction force, etc.

It should be appreciated that such a position adjusting means 12 may also be applied to the reactor vibration monitoring device 14 shown in FIG. 1 and the reactor vibration monitoring device 15 shown in FIG. 8.

In the present embodiment of such a configuration, as in the first embodiment, ultrasonic waves of pulse train form transmitted from the pulse train generating means 10 are reflected and attenuated by the boundary between the wall of the reactor pressure vessel 1 and the clad weld layer 8 and the boundary between the clad weld layer 8 and the reactor water, and further attenuated in the clad weld layer 8. The ultrasonic waves also spread out due to a tilt and/or a curvature of the inspection object 2, and the ultrasonic wave receiving means 3b receives reflected ultrasonic pulses of pulse train form shown in FIG. 13.

The positional relationship between the pulse train generating means 10 and the ultrasonic wave receiving means 3b may be affected by errors in the dimensions and arrangements of the reactor pressure vessel 1 and the inspection object 2, heat deterioration, measurement errors in temperature, etc. Then, the relative position of the ultrasonic wave receiving means 3b can be adjusted by using the position adjusting means 12 so as to circumvent the effect of errors, heat deterioration, etc.

Figure 13:
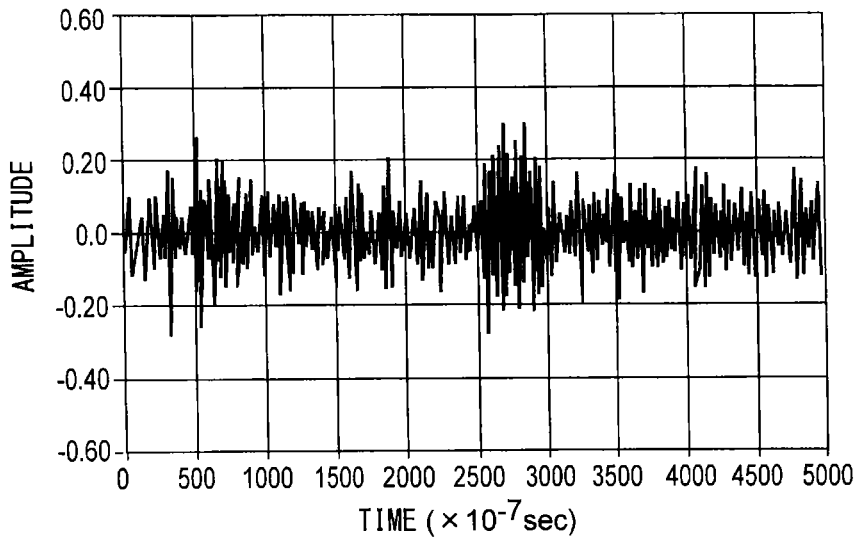
FIG. 13 is a graph stored in the preprocessing means of FIG. 11 for a case with interruption or scattering.

Consequently, the position adjusting means 12 can be operated to change the position of the ultrasonic wave receiving means 3b so that the reflected ultrasonic pulses of pulse train form shown in FIG. 13 have an improved S/N ratio.

Figure 14:
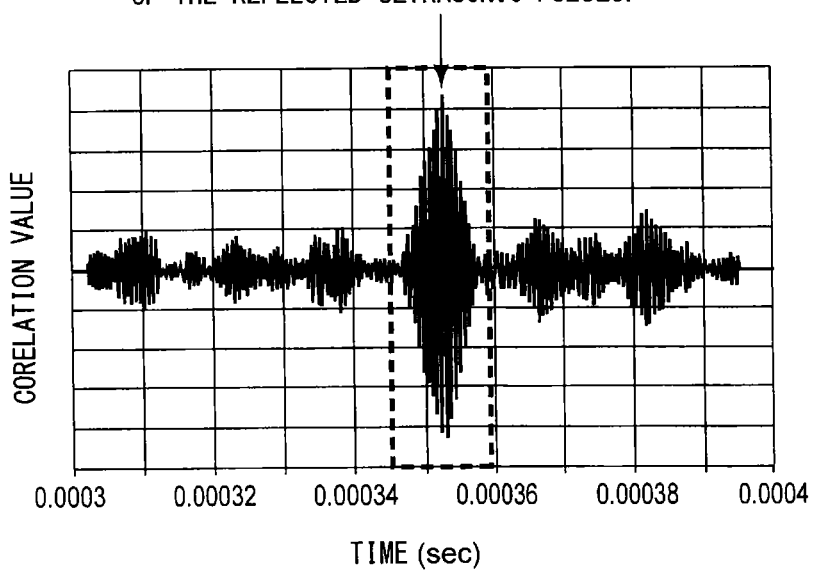
FIG. 14 is a graph of the result of differential processing by the preprocessing means of FIG. 11.

Next, the preprocessing means 11 performs analog-to-digital conversion on the ultrasonic pulses shown in FIG. 13, and performs a calculation to calculate a correlation value with respect to the waveform of the ultrasonic pulse train shown in FIG. 12, transmitted from the pulse train generating means 10. Such a calculation corresponds to processing of extracting the same waveform as that of the ultrasonic pulse train shown in FIG. 12 from the waveform of FIG. 13. As the waveform of FIG. 13 is scanned from left to right for the ultrasonic pulse train, the correlation value has the peaks where the pattern is the same as or similar to that of the ultrasonic pulse train. FIG. 14 shows an example of the result of the correlation calculation. The correlation value increases gradually near the observation time of the ultrasonic pulse train, shows a maximum value, and then decreases gradually. The time when the correlation value shows the maximum value is the observation time of the ultrasonic pulse train. The correlation value can thus be determined to identify the observation time of the ultrasonic pulse train from the inspection object 2.

Consequently, as shown in FIG. 14, the calculation means 5 can calculate a correlation value between the ultrasonic pulse train and the reflected pulse signal to easily identify reflected ultrasonic pulses from the inspection object 2, and determine the vibration frequency and vibration amplitude of the inspection object 2 from the data on changes in the propagation time of the reflected ultrasonic pulses extracted.

According to the present embodiment, even when detecting vibrations of the internal equipment 2 having a tilt and/or a curvature in the reactor pressure vessel 1 in the presence of errors in dimensions and arrangements, heat deterioration, and/or measurement errors in temperature, the position adjusting means 12 can be operated to change the position of the ultrasonic wave receiving means 3b so as to increase the S/N ratio of reflected ultrasonic pulses from the internal equipment 2. Vibrations can be detected without attaching a reflector to the internal equipment 2.

In addition, a correlation value between an ultrasonic pulse train generated by the pulse train generating means 10 and a reflected pulse signal received by the ultrasonic wave receiving means 3b can be calculated to identify reflected ultrasonic pulses from the internal equipment 2 for accurate vibration detection.

Figure 15:
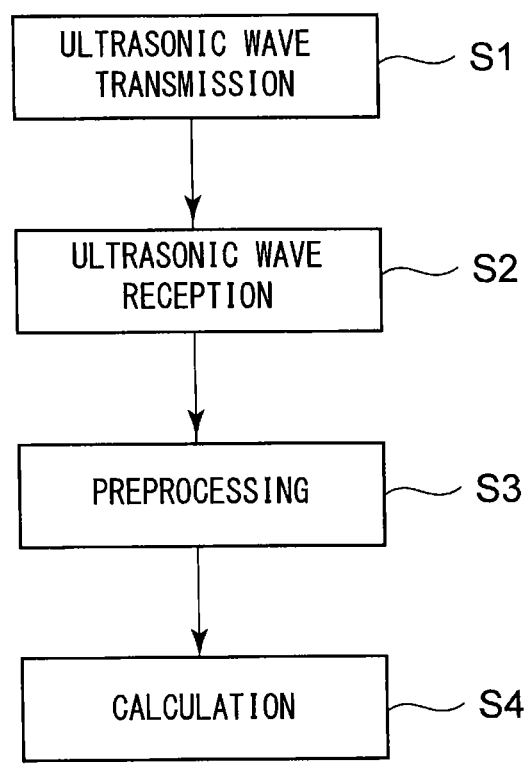
FIG. 15 is a flow chart showing a schematic configuration of a reactor vibration monitoring method of the present invention.

Now, a reactor vibration monitoring method will be described with reference to FIGS. 8 and 15.

Initially, in an ultrasonic wave transmission step S1, the ultrasonic wave transmission means 3a is installed on the outside surface of the reactor pressure vessel 1 and transmits ultrasonic pulses to the interior of the reactor pressure vessel 1.

Next, in an ultrasonic wave receiving step S2, the ultrasonic wave receiving means 3b is installed on the outside surface of the reactor pressure vessel 1 and receives reflected pulses including ultrasonic waves of the ultrasonic pulses reflected by the inspection object 2.

Then, in a preprocessing step S3, reflected ultrasonic pulses occurring in the wall of the reactor pressure vessel 1 are identified and removed from the reflected pulse signal received by the ultrasonic wave receiving means 3b, or a reflected pulse signal reflected by the inspection object 2 is selectively extracted.

Moreover, in a calculation step S4, vibrations of the inspection object 2 are determined from the reflected pulse signal processed in the preprocessing step S3 based on observation time of the inspection object 2.

According to the present embodiment, even when detecting vibrations of the internal equipment 2 having a tilt and/or a curvature in the reactor pressure vessel 1 in the presence of errors in dimensions and arrangements, heat deterioration, and/or measurement errors in temperature, reflected ultrasonic pulses occurring in the wall of the reactor pressure vessel 1 can be removed from the received waveform including the reflected pulse signal or the reflected pulse signal reflected by internal equipment 2 can be selectively extracted to increase the S/N ratio of the reflected ultrasonic pulses from the internal equipment 2. Vibrations of the internal equipment 2 can be detected without attaching a reflector to the internal equipment 2.

While embodiments of the present invention have been described above, the present invention is by no means limited to the foregoing embodiments. The configurations of the embodiments may be combined to make various modifications without departing from the gist of the present invention.

What is claimed is:

1. A reactor vibration monitoring device, comprising:
ultrasonic wave transmission means disposed on an outside surface of a reactor pressure vessel, for transmitting ultrasonic pulses to an interior of the reactor pressure vessel;
ultrasonic wave receiving means disposed on the outside surface of the reactor pressure vessel, for receiving reflected pulses including ultrasonic waves of the ultrasonic pulses reflected by an inspection object disposed in the reactor pressure vessel;
preprocessing means for performing processing to exclude reflected ultrasonic pulses reflected in a wall of the reactor pressure vessel from a reflected pulse signal received by the ultrasonic wave receiving means; and
calculation means for determining vibrations of the inspection object from the reflected pulse signal processed by the preprocessing means, based on an observation time of the inspection object, wherein:
the ultrasonic wave transmission means is a pulse train generating means for transmitting an ultrasonic pulse train to the reactor pressure vessel; and
the preprocessing means calculates a correlation value between a waveform of the ultrasonic pulse train and the reflected pulse signal at the observation time.

2. A reactor vibration monitoring device, comprising:
ultrasonic wave transmission means disposed on an outside surface of a reactor pressure vessel, for transmitting ultrasonic pulses to an interior of the reactor pressure vessel;
ultrasonic wave receiving means disposed on the outside surface of the reactor pressure vessel, for receiving reflected pulses including ultrasonic waves of the ultrasonic pulses reflected by an inspection object disposed in the reactor pressure vessel;
preprocessing means for performing processing to exclude reflected ultrasonic pulses reflected in a wall of the reactor pressure vessel from a reflected pulse signal received by the ultrasonic wave receiving means; and
calculation means for determining vibrations of the inspection object from the reflected pulse signal processed by the preprocessing means, based on an observation time of the inspection object, wherein:
the preprocessing means performs low frequency component extraction processing of squaring an amplitude of the reflected pulsed signal and extracts a component having a frequency lower than a predetermined frequency.

3. A reactor vibration monitoring device, comprising:
ultrasonic wave transmission means disposed on an outside surface of a reactor pressure vessel, for transmitting ultrasonic pulses to an interior of the reactor pressure vessel;
ultrasonic wave receiving means disposed on the outside surface of the reactor pressure vessel, for receiving reflected pulses including ultrasonic waves of the ultrasonic pulses reflected by an inspection object disposed in the reactor pressure vessel;
preprocessing means for performing processing to exclude reflected ultrasonic pulses reflected in a wall of the reactor pressure vessel from a reflected pulse signal received by the ultrasonic wave receiving means; and
calculation means for determining vibrations of the inspection object from the reflected pulse signal processed by the preprocessing means, based on an observation time of the inspection object, wherein:
the preprocessing means stores a differential processing-specific waveform in advance, and performs differential processing of the reflected pulse signal and the differential processing-specific waveform.

4. The reactor vibration monitoring device according to claim 3, comprising interrupting means for interrupting the ultrasonic pulses transmitted from the ultrasonic wave transmission means for an arbitrary time, between an inner surface of the reactor pressure vessel and the inspection object, and wherein
the preprocessing means stores, as the differential processing-specific waveform, a signal that is received by the ultrasonic wave receiving means with the ultrasonic pulses interrupted by the interrupting means.

5. The reactor vibration monitoring device according to claim 3, comprising:
a partial replica of the reactor pressure vessel; and
replica ultrasonic wave transmission means and replica ultrasonic wave receiving means arranged on the partial replica in a same positional relationship as that of the ultrasonic wave transmission means and the ultrasonic wave receiving means, and wherein
the preprocessing means stores, as the differential processing-specific waveform, a signal received by the replica ultrasonic wave receiving means when the replica ultrasonic wave transmission means transmits ultrasonic waves to the partial replica.

6. The reactor vibration monitoring device according to claim 3, wherein the preprocessing means identifies the reflected ultrasonic pulses reflected in the wall of the reactor pressure vessel based on a wall thickness of the reactor pressure vessel and the attached positions of the ultrasonic wave transmission means and the ultrasonic wave receiving means.

7. The reactor vibration monitoring device according to claim 3, wherein the preprocessing means stores, as the differential processing-specific waveform, the reflected ultrasonic pulses reflected in the wall of the reactor pressure vessel based on a wall thickness of the reactor pressure vessel and the attached positions of the ultrasonic wave transmission means and the ultrasonic wave receiving means.

8. The reactor vibration monitoring device according to claim 3, comprising position adjusting means for adjusting a relative position between the ultrasonic wave transmission means and the ultrasonic wave receiving means.

9. The reactor vibration monitoring device according to claim 3, wherein the preprocessing means performs extraction processing of identifying or extracting from the reflected pulse signal a time domain where ultrasonic pulses reflected by the inspection object are included, based on positions of the ultrasonic wave transmission means, the inspection object, and the ultrasonic wave receiving means.

10. A reactor vibration monitoring method, comprising:
an ultrasonic wave transmission step in which ultrasonic wave transmission means is installed on an outside surface of a reactor pressure vessel and transmits ultrasonic pulses to an interior of the reactor pressure vessel;
an ultrasonic wave receiving step in which ultrasonic wave receiving means is installed on the outside surface of the reactor pressure vessel and receives reflected pulses including ultrasonic waves of the ultrasonic pulses reflected by an inspection object in the reactor pressure vessel;

a preprocessing step of performing processing to exclude reflected ultrasonic pulses occurring in a wall of the reactor pressure vessel from a reflected pulse signal received by the ultrasonic wave receiving means; and a calculation step of determining vibrations of the inspection object from the reflected pulse signal processed in the preprocessing step based on observation time of the inspection object, wherein:

the preprocessing step includes: storing a differential processing-specific waveform in advance, and performing differential processing of the reflected pulse signal and the differential processing-specific waveform.

* * * * *